Feb. 4, 1958         S. R. CROCKETT         2,821,859
AIR BEARING GYRO AND PICKUP
Filed March 16, 1953
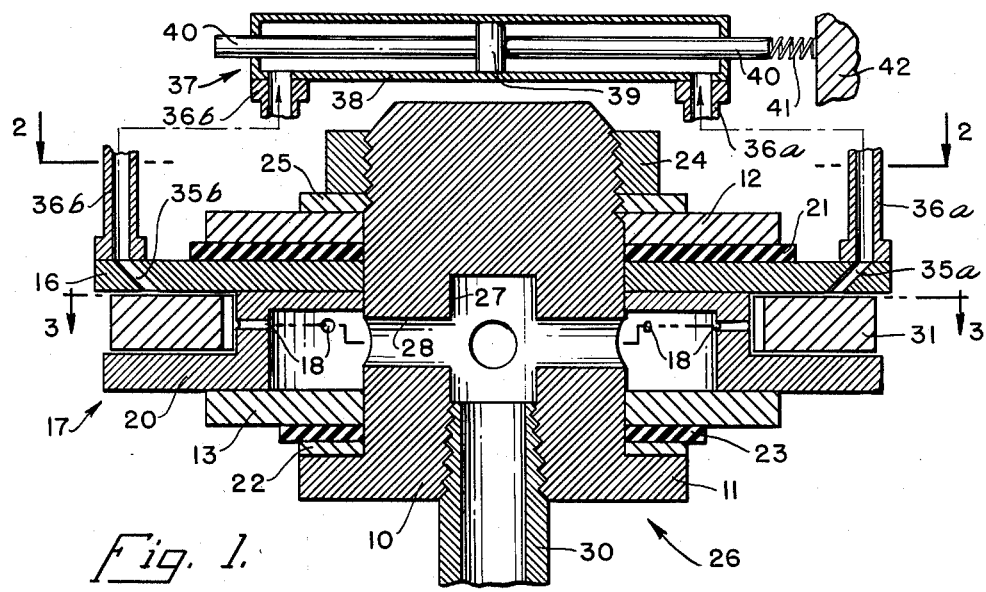
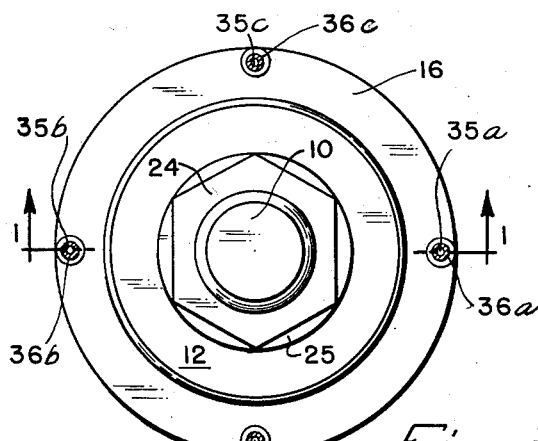
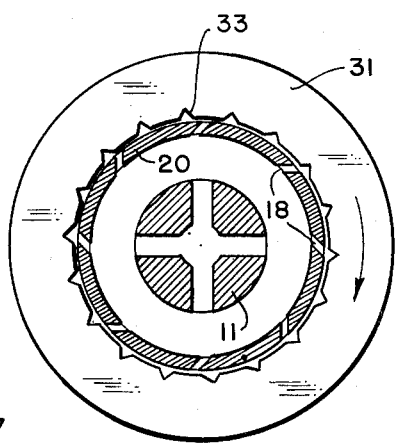
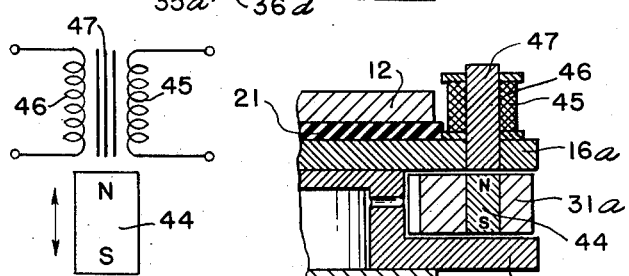
*INVENTOR.*
SYDNEY R. CROCKETT
BY
ATTORNEYS

United States Patent Office 2,821,859
Patented Feb. 4, 1958

2,821,859

AIR BEARING GYRO AND PICKUP

Sydney R. Crockett, Van Nuys, Calif.

Application March 16, 1953, Serial No. 342,766

7 Claims. (Cl. 74—5.6)

(Granted under Title 35, U. S. Code (1952), sec. 266)

This invention relates to gyroscopes and more particularly to a rate gyro, that is, a gyroscope adapted to sense the rate of roll, pitch or yaw of an aircraft or missile or the like. The invention may have other adaptations or uses wherever the rate of angular motion is to be measured and/or recorded, or as a component in the control of automatic machinery of certain types.

The invention is an improvement over similar rate gyros known to the prior art, particularly rate gyros mounted in gimbals and having a restraining spring to resist torque exerted by the gyro. In many of the prior art devices the use of springs, dashpots, or other dampening devices are used to minimize oscillation. Such systems are complex and require precision construction.

The present invention provides a rate gyro, offering the maximum in simplicity not only as to its mounting but as to the manner in which the deflection of the rotor of a rate gyro is measured as an indication of the rate of angular movement or motion of the device on which the rate gyro is mounted, and in the manner by which the rotor is restrained.

The rate gyro of this invention requires no mechanical bearing or journal of any kind in its mounting and no restraining spring to resist torque exerted by the rotor. The device is of such a nature that its various components require little precision in their manufacture.

The primary object of the invention is to provide a rate gyro offering the maximum in simplicity of construction and manufacture and in the mode of indicating the rate of angular movement being measured and in the manner of restraining the rotor.

Another object of the invention is to provide a rate gyro having an air bearing and having means to measure differentials in pressure in the air bearing as an indication of rate of angular movement of the device in which the rate gyro is secured or mounted.

Another object of the invention is to provide a rate gyro providing a ring shaped rotor member having flat surfaces rotating adjacent fixed flat surfaces of a rotor housing with means to provide a flow of air in the laminar space between the surfaces, the clearance between the surfaces varying in response to precessing movement of the rotor, such that differentials in pressure between the laminar surfaces can be measured as an indication of the rate of angular motion of a device on which the rate gyro is mounted.

Further objects and numerous advantages of the invention will become apparent from the following detailed description and annexed drawings wherein:

Fig. 1 is an enlarged section taken on line 1—1 of Fig. 2 of a preferred form of the invention showing a differential pressure measuring device partly diagrammatically and partly in longitudinal section.

Fig. 2 is a reduced section taken on line 2—2 of Fig. 1.

Fig. 3 is a reduced section taken on line 3—3 of Fig. 1.

Fig. 4 is a fragmentary section of a modified detail of the invention.

Fig. 5 is a diagrammatic arrangement of the electromagnetic elements of Fig. 4.

Referring now to the drawings, the device of Fig. 1 comprises a central hub or arbor 10 having a flange 11 at the lower part, and being screw threaded at the upper part. Fitted over the hub 10 are ring shaped plates 12 and 13. Secured or clamped between these plates are a ring shaped coverplate 16 and a combination manifold and baseplate 17. The manifold and baseplate 17 is of inverted cup shape having spaced circumferential ports 18 and having an extending flange portion 20 of larger diameter which engages with the plate 13. Disposed between the flange 11 and plate 13 is a washer 22 and a rubber sealing ring 23. A nut 24 engages the screw threaded end of member 10, bears against a washer 25, and serves to clamp all of the parts as so far described together into a housing 26.

The arbor 10 has a longitudinal bore 27 and radially extending ports 28 communicating with this bore. These ports communicate with the interior of the combination manifold and baseplate 17. The bore 27 is internally threaded and engages a screw threaded fitting 30 which provides for communication of air pressure into the device.

Ring shaped rotor, or rotor ring, 31, which is shown in detail in Fig. 3, is disposed around the combination manifold and baseplate 17. It has flat sides which are adjacent the cover plate 16 and the extending flange 20 of member 17. There is a relatively small clearance between these parts. Rotor 31 has notches or scallops 33 on the interior thereof as shown in Fig. 3. In operation, air under pressure is supplied through fitting 30 and is communicated through the interior of member 17 through the bore 27 and ports 28 and it is thence discharged through ports 18, see Fig. 3, to form jets of air which impinge against scallops 33 so as to rotate the rotor member 31 at a relatively high speed. The air which drives the rotor 31 escapes around the rotor member 31, that is, between the flat surfaces of rotor 31 and the adjacent surfaces of member 16 and flange 20. The air around the rotor member 31 forms an air bearing for the rotor so that no mechanical bearing is required and no lubrication is necessary.

The pick-off of the rate gyro comprises ports 35a, 35b, 35c and 35d located in the periphery of cover plate 16 and tubes or conduits 36a, 36b, 36c and 36d which provide communication with pneumatic measuring means, an example of which is illustrated at 37.

The four ports may be spaced 90° apart around the circumference of member 16, communicate with points at equal radial distance from the center of hub 10 and the spin axis of rotor 31, and act as probes of the pressure existing in the laminar space between the rotor 31 and the member 16.

In the upper portion of Fig. 1 there is illustrated pneumatic measuring means 37, an example of one of several different types of apparatus that may be used to measure the differences in pressure existing between diagonally located points between member 16 and rotor 31. The differential pressure measuring means 37 illustrated has a cylinder 38 in which there is slidably mounted a piston 39. The piston is provided with a piston rod 40 which extends through both ends of cylinder 38. One end of rod 40 is secured by means of spring 41 to a member 42 which is immovable relative to cylinder 38. The pressure from port 35a is communicated to the interior of cylinder 38 on one side of piston 39 by conduit 36a. The pressure from port 35b is communicated to the interior of cylinder 38 on the other side of piston 39 by conduit 36b. The location of piston 39 is, therefore, a measure of the difference in pressure existing in ports 35a and 35b.

In the operation of the device, the plane of rotation of rotor 31 always tends to keep its orientation fixed in inertial space. As the vehicle or device on which hub 10 is mounted rotates about an axis lying in the plane of rotation, rotor 31 will tend to retain its orientation and thus causes non-parallelism between the surfaces of rotor 31 and the adjacent surfaces of housing 26. The air flowing around rotor 31 will exert a torque on rotor 31 tending to turn rotor 31 so as to eliminate the non-parallelism between the surface of rotor 31 and its housing. This unbalanced torque will cause rotor 31 to precess, and as rotor 31 precesses, the air flowing around rotor 31 will create a second torque to oppose the precession of rotor 31. The difference in pressure measured by pneumatic measuring means 37 is then a measure of the angular deflection or precession torque of rotor 31 relative to hub 10 which in turn is a function of the angular velocity at which hub 10 is being rotated. It is this characteristic of a restrained gyroscope that permits it to be used to measure angular velocity. The pneumatic measuring means 37 may directly or indirectly, for example, control servo motors which would, in turn, operate control surfaces of an aircraft, missile, or the like.

From the foregoing it will be observed that the device is extremely simple and requires no mechanical bearing or lubrication. There is no need for springs, dashpots, dampening devices, or the like, with the result that the device is very rugged in construction and positive in its operation.

Fig. 4 shows a modified form of the invention involving electromagnetic pickoff means for measuring the amount of non-parallelism between rotor 31a and housing 26a. Fig. 5 shows schematically one form the electro magnetic elements may take to accomplish this. Rotor 31a has incorporated therein a ring shaped permanent magnet 44. One face of the ring is a north magnetic pole and the other face is a south magnetic pole. The take-offs comprise electrical coils 45 and 46 mounted on cover plate 16a, the location of the coils being similar to the location of ports 35a, 35b, 35c and 35d of the modification illustrated in Fig. 1. Coils 45 and 46 are provided with a soft iron core 47, the lower end of which extends through cover plate 16a to a point adjacent the top face of permanent magnet 44. The space between rotor 31a and soft iron core 47 provides a gap in the magnetic circuit through magnet 44 and core 47. In the modification illustrated in Fig. 4 all the parts are made of non-magnetic material except for magnet 44 and core 47.

Referring now to Fig. 5, coil 46, for example, may be energized by the application of a voltage of 115 volts at 400 cycles/sec. The output across coil 45 will vary depending upon the location of magnet 44 relative to core 47 as is well known in the saturable reactor art. In this way the size of the gap between magnet 44 and soft iron core 47 can be determined and the size of the gap is a measure of angular deflection of rotor 31a. The output of coil 45 may, for example, control a relay or recorder, or the like to indicate change in the magnitude of the gap or to control servo motors.

From the foregoing, those skilled in the art will observe that I have provided a very simple yet dependable and positive acting form of rate gyro adaptable to many uses in missiles, aircraft, etc.

The foregoing disclosure is representative of preferred forms of my invention and is intended to be illustrative of rather than limiting on the invention. The scope of the invention is to be as in accordance with the claims annexed hereto.

The invention described herein may be manufactured and used by or for the Government of the United States of America for governmental purposes without the payment of any royalties thereon or therefor.

What is claimed is:

1. A rate gyro comprising a ring shaped rotor having flat side portions, means forming an air bearing for said rotor comprising a housing within which said rotor rotates, the housing having inner walls closely adjacent the side portions of the rotor to form spaces, means to admit air to said housing, means causing said air to escape between the rotor and housing to form an air bearing for the rotor, and means to measure changes in the magnitude of the space between the rotor and the inner walls of the housing resulting from precessing of the rotor caused by gyroscopic action as it is moved in space.

2. The structure of claim 1 wherein said last means comprises magnetic devices having a magnetic circuit including therein the space between the rotor and an inner wall of said housing and means to sense variations in reluctance due to the said space.

3. The structure of claim 1 wherein said last means comprises apparatus for measuring the air pressure in the space between the rotor and adjacent inner wall of said housing at diametrically opposed points.

4. A rate gyro comprising a housing, a rotor located in said housing, said rotor and housing being so constructed that said rotor is sustained for rotation solely by a flowing fluid and rotated by said flowing fluid, a circular gap between a portion of said rotor and a portion of said housing, and means for detecting a non-uniform thickness of said gap due to precession of said rotor.

5. In a rate gyro, a chamber through which a fluid medium may flow, a rotor disposed for rotation in said chamber, means for delivering a fluid to said chamber, the rotor and chamber being so constructed and arranged that fluid flowing through the chamber normally suspends the rotor in space with a gap of uniform thickness between a portion of the rotor and a portion of the chamber, and means for detecting a non-uniform thickness of said gap due to precession of said rotor.

6. Apparatus in accordance with claim 5 wherein the rotor is rotated by the fluid medium which is delivered to the chamber.

7. In a rate gyro, a chamber through which a gaseous medium may flow, a rotor disposed in said chamber, means for delivering a gaseous medium to said chamber and toward said rotor in such a manner that the rotor will spin within the chamber, the rotor and chamber being so constructed that the gas flowing through said chamber normally suspends the rotor in space with a gap of uniform thickness between a portion of the rotor and a portion of the chamber, and means for measuring the thickness of said gap.

References Cited in the file of this patent

UNITED STATES PATENTS

| | | |
|---|---|---|
| 1,841,606 | Kollsman | Jan. 19, 1932 |
| 1,864,801 | Chaplin | June 28, 1932 |
| 1,978,425 | Gillmor | Oct. 30, 1934 |
| 1,986,807 | Gillmor | Jan. 8, 1935 |
| 2,086,897 | Carter et al. | July 13, 1937 |
| 2,142,018 | Carter | Dec. 27, 1938 |
| 2,534,824 | Jones | Dec. 19, 1950 |